United States Patent
Raghavan et al.

(10) Patent No.: US 11,562,571 B2
(45) Date of Patent: Jan. 24, 2023

(54) VEHICLE NEURAL NETWORK

(71) Applicant: Ford Global Technologies, LLC, Dearborn, MI (US)

(72) Inventors: Nithin Raghavan, Duluth, GA (US); Shubham Shrivastava, Sunnyvale, CA (US); Punarjay Chakravarty, Campbell, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 152 days.

(21) Appl. No.: 17/102,557

(22) Filed: Nov. 24, 2020

(65) Prior Publication Data
US 2022/0164582 A1   May 26, 2022

(51) Int. Cl.
| | | |
|---|---|---|
| *G06K 9/00* | (2022.01) | |
| *G06K 9/62* | (2022.01) | |
| *G06N 3/08* | (2006.01) | |
| *G06N 3/063* | (2006.01) | |
| *G06V 20/56* | (2022.01) | |

(52) U.S. Cl.
CPC ........... *G06V 20/56* (2022.01); *G06K 9/6215* (2013.01); *G06K 9/6231* (2013.01); *G06K 9/6259* (2013.01); *G06K 9/6289* (2013.01); *G06N 3/063* (2013.01); *G06N 3/08* (2013.01)

(58) Field of Classification Search
CPC .... G06V 20/56; G06K 9/6215; G06K 9/6231; G06K 9/6259; G06K 9/6289; G06N 3/063; G06N 3/08
See application file for complete search history.

(56) References Cited

U.S. PATENT DOCUMENTS

| | | | |
|---|---|---|---|
| 9,990,687 B1 * | 6/2018 | Kaufhold | G06K 9/6247 |
| 10,762,398 B2 | 9/2020 | Sjolund et al. | |
| 2018/0247201 A1 | 8/2018 | Liu et al. | |
| 2019/0259175 A1 | 8/2019 | Inoue et al. | |
| 2020/0041276 A1 * | 2/2020 | Chakravarty | G06N 3/088 |

OTHER PUBLICATIONS

Abdi et al., "3D Hand Pose Estimation using Simulation and Partial-Supervision with a Shared Latent Space", arXiv:1807.05380v1; Jul. 14, 2018.

(Continued)

*Primary Examiner* — David F Dunphy
(74) *Attorney, Agent, or Firm* — Frank A. MacKenzie; Bejin Bieneman PLC (57) ABSTRACT

A computer, including a processor and a memory, the memory including instructions to be executed by the processor to receive a monocular image and provide the image to a variational autoencoder neural network (VAE), wherein the VAE has been trained in a twin configuration that includes a first encoder-decoder pair that receives as input unlabeled real images and outputs reconstructed real images, and a second encoder-decoder pair that receives as input synthetic images and outputs reconstructed synthetic images and wherein the VAE includes third and fourth decoders that are trained using labeled synthetic images, segmentation ground truth and depth ground truth. The instructions can include further instructions to output from the VAE a segmentation map and a depth map based on inputting the monocular image.

20 Claims, 8 Drawing Sheets

(56) References Cited

OTHER PUBLICATIONS

Chakravarty et al., "GEN-SLAM: Generative Modeling for Monocular Simultaneous Localization and Mapping", arXiv:1902.02086v1; Feb. 6, 2019.
Guizilini et al., "3D Packing for Self-Supervised Monocular Depth Estimation", arXiv:1905.02693v4; Mar. 28, 2020.
Zhu et al., "Unpaired Image-to-Image Translation using Cycle-Consistent Adversarial Networks", arXiv:1703.10593v7; Aug. 24, 2020.

\* cited by examiner

VEHICLE NEURAL NETWORK

BACKGROUND

Vehicles can be equipped with computing devices, networks, sensors, and controllers to acquire and/or process data regarding the vehicle's environment and to operate the vehicle based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated on a roadway.

DETAILED DESCRIPTION

A computing device in a traffic infrastructure system can be programmed to acquire data regarding the external environment of a vehicle and to use the data to determine a vehicle path upon which to operate a vehicle in an autonomous or semi-autonomous mode. A vehicle can operate on a roadway based on a vehicle path by determining commands to direct the vehicle's powertrain, braking, and steering components to operate the vehicle to travel along the path. The data regarding the external environment can include the location of one or more objects such as vehicles and pedestrians, etc., in an environment around a vehicle and can be used by a computing device in the vehicle to operate the vehicle.

A computing device in a vehicle can be programmed to detect objects and regions based on image data acquired by a sensor included in the vehicle. The computing device can include a neural network trained to detect objects and regions in image data. Detecting objects and regions in the context of this document means determining labels, locations, and sizes of objects and regions in image data. Object and region labels typically include a substantially unique identifier for an object or region such as a text string that identifies the object or region, where an object or a region is a physical item that occupies three dimensions, e.g., a roadway, a vehicle, a pedestrian, a building or foliage, etc. Locating an object or region in an image can include determining the pixel locations in an image that include the object. A neural network is typically implemented as a computer software program that can be trained to detect objects and regions in image data using training datasets that include images with examples of objects and regions and corresponding ground truth that identifies the objects and regions. Ground truth is data regarding the object that is obtained from a source independent from the neural network. Ground truth data is data determined or deemed to correspond to, i.e., represent, actual real world conditions or states. For example, ground truth regarding the objects can be obtained by having human observers view the images and determine object labels, locations and sizes.

A technique for detecting objects and regions in image data is to train a neural network to generate a segmentation map. A segmentation map is an image in which objects in an input image are identified by determining a label, which can be a number, a location and a size of corresponding to objects in an image. Labeled objects can include roadways, vehicles, pedestrians, buildings and foliage, for example. The location and size of the objects can be indicated in the image by replacing the pixels corresponding to the object with a solid color. For example, objects in an input image corresponding to roadways can be assigned a first number and replaced with the color green, regions of the input image corresponding to vehicles can be assigned a second number and replaced with the color red, regions of the image corresponding to foliage can be assigned a third number and replaced with the color yellow, and so forth. An instance segmentation map is a segmentation map where multiple instances of a single type of region, such as vehicle, are each assigned a different number and color. A neural network can be trained to determine a segmentation map from an input monocular color (RGB) image by training the neural network with a large number (typically >1000) of training images with corresponding ground truth. A monocular image is an image acquired by a single camera, as opposed to a stereo image which includes two or more images acquired by two or more cameras. The neural network can also be trained to process images acquired from sensors including monochrome cameras, infrared cameras or cameras that acquire a combination of color and infrared data. In this example ground truth includes segmented images obtained from a source independent from the neural network. For example, images in a training dataset can be segmented by human observers using image processing software to assign values to regions in the training images.

A depth map is an image in which pixels of the image are assigned values according to the distance or range from the sensor that acquired the image to the point in real world three-dimensional (3D) space that corresponds to the image pixel. A neural network can be trained to determine a depth map from a monocular RGB image by training the neural network with a large number (typically >1000) of training images and corresponding ground truth. In this example ground truth includes depth maps obtained from a source independent from the neural network, for example a lidar sensor or a stereo video camera. Lidar sensors output distance or range data that can be processed to match the range data from the lidar sensor with the field of view of a color video sensor. Likewise, image data from a stereo video camera, which includes two or more cameras mounted to provide a fixed baseline or distance between the cameras, can be processed to provide distance or range data that corresponds to a color video camera field of view. Ground truth depth maps obtained in this fashion can be paired with corresponding monocular RGB images and used to train a neural network to produce depth maps from monocular RGB images.

A neural network can be trained by presenting the neural network with a large number (typically >1000) of training images that include objects along with corresponding ground truth. During training the neural network processes an input image and the result, referred to herein as an output state, is compared to the ground truth. The neural network can process the input image a plurality of times, varying processing parameters each time the image is processed. The output state of the neural network is compared to the ground truth to determine a set of processing parameters that achieves the correct output state when presented with an input image. Acquiring a training dataset and ground truth suitable for training a neural network can be expensive, time consuming and unreliable due to the human judgement involved, and is inefficient and challenging in terms of consumption of computing resources.

Techniques discussed herein improve the training and operation of a neural network by generating simulated images that correspond to scenes included in real images acquired using a real image sensor viewing a real world scene. Because the simulated images are generated by photorealistic image rendering software, the identity and location of objects and regions in 3D space, segmentation data, and 3D distances to points in the image are known. A neural network can be configured as discussed herein to permit the neural network to be trained using simulated images and the training transferred to real images. In this fashion the neural network can be trained to operate on real images without the expense, time and computing resources required to determine ground truth data for real images in a training dataset. Techniques discussed herein can be used to train a neural network to produce output that can be used to operate a vehicle, a stationary robot, a mobile robot, a drone or a surveillance system, for example.

Disclosed herein is a method, including receiving a monocular image and provide the image to a variational autoencoder neural network (VAE), wherein the VAE has been trained in a twin configuration that includes a first encoder-decoder pair that receives as input unlabeled real images and outputs reconstructed real images, and a second encoder-decoder pair that receives as input synthetic images and outputs reconstructed synthetic images and wherein the VAE includes third and fourth decoders that are trained using labeled synthetic images, segmentation ground truth and depth ground truth and outputting from the VAE a segmentation map and a depth map based on inputting the monocular image. Training the VAE in a twin configuration can include a third decoder outputting the segmentation map and a fourth decoder outputting the depth map. The segmentation ground truth can include labels for a plurality of objects in the labeled synthetic images, and the depth ground truth includes distances from a sensor to a plurality of locations in the labeled synthetic images. The segmentation map can include labeled objects including roadways, buildings, foliage, vehicles and pedestrians. The depth map can include distances from a sensor to a plurality of locations. The real image can be acquired by a real world sensor viewing a real world scene.

The synthetic images can be generated by photorealistic image rendering software based on data input to the photorealistic image rendering software that describes a scene to be rendered by the photorealistic image rendering software. The segmentation ground truth and depth ground truth can be generated based on a scene description input to the photorealistic image rendering software that describes the scene to be rendered by the photorealistic image rendering software. The VAE can include first and second encoders for the unlabeled real images and the labeled synthetic images, and further wherein the first and second encoders each include layers that share weights with the other of the first or second encoder, a shared latent space, and respective first and second decoders for the unlabeled real images and labeled synthetic images. The VAE can be further trained the VAE based on determining cycle consistency between the first encoder-decoder and the second encoder-decoder. Training the VAE can be based on determining cycle consistency includes comparing an input real image and a reconstructed real image by determining Kullback-Leibler divergence loss and maximum mean discrepancy loss. Operating a device can be based on the segmentation map and the depth map. The device can be one of a vehicle, a mobile robot, a stationary robot, a drone, and a surveillance system. The vehicle can be operated by controlling one or more of vehicle propulsion, vehicle brakes, and vehicle steering based on determining a vehicle path based on the segmentation map and the depth map.

Disclosed is a computer readable medium, storing program instructions for executing some or all of the above method steps. Further disclosed is a computer programmed for executing some or all of the above method steps, including a computer apparatus, programmed to receive a monocular image and provide the image to a variational autoencoder neural network (VAE), wherein the VAE has been trained in a twin configuration that includes a first encoder-decoder pair that receives as input unlabeled real images and outputs reconstructed real images, and a second encoder-decoder pair that receives as input synthetic images and outputs reconstructed synthetic images and wherein the VAE includes third and fourth decoders that are trained using labeled synthetic images, segmentation ground truth and depth ground truth and output from the VAE a segmentation map and a depth map based on inputting the monocular image. Training the VAE in a twin configuration can include a third decoder outputting the segmentation map and a fourth decoder outputting the depth map. The segmentation ground truth can include labels for a plurality of objects in the labeled synthetic images, and the depth ground truth includes distances from a sensor to a plurality of locations in the labeled synthetic images. The segmentation map can include labeled objects including roadways, buildings, foliage, vehicles and pedestrians. The depth map can include distances from a sensor to a plurality of locations. The real image can be acquired by a real world sensor viewing a real world scene.

The computer can be further programmed to generate synthetic images by photorealistic image rendering software based on data input to the photorealistic image rendering software that describes a scene to be rendered by the photorealistic image rendering software. The segmentation ground truth and depth ground truth can be generated based on a scene description input to the photorealistic image rendering software that describes the scene to be rendered by the photorealistic image rendering software. The VAE can include first and second encoders for the unlabeled real images and the labeled synthetic images, and further wherein the first and second encoders each include layers that share weights with the other of the first or second encoder, a shared latent space, and respective first and second decoders for the unlabeled real images and labeled synthetic images. The VAE can be further trained the VAE based on determining cycle consistency between the first encoder-decoder and the second encoder-decoder. Training the VAE can be based on determining cycle consistency includes comparing an input real image and a reconstructed real image by determining Kullback-Leibler divergence loss and maximum mean discrepancy loss. Operating a device can be based on the segmentation map and the depth map. The device can be one of a vehicle, a mobile robot, a stationary robot, a drone, and a surveillance system. The vehicle can be operated by controlling one or more of vehicle propulsion, vehicle brakes, and vehicle steering based on determining a vehicle path based on the segmentation map and the depth map.

Figure 1:
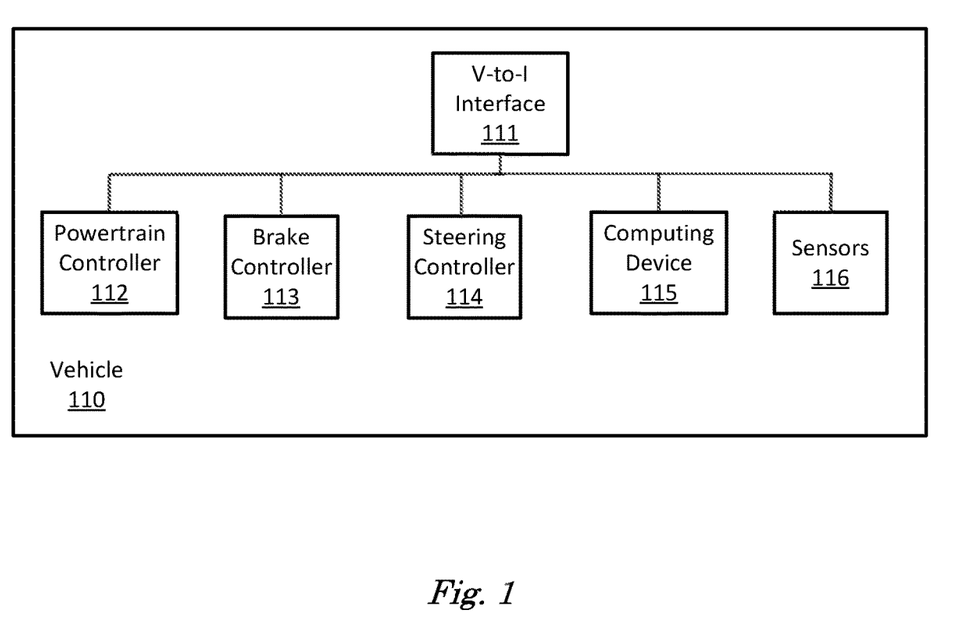
FIG. 1 is a diagram of an example vehicle.

FIG. 1 is a diagram of a vehicle 110 operable in autonomous ("autonomous" by itself in this disclosure means "fully autonomous"), semi-autonomous, and occupant piloted (also referred to as non-autonomous) mode. By a semi- or fully-autonomous mode, we mean a mode of operation wherein a vehicle can be piloted partly or entirely by a computing device as part of a system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or more of vehicle propulsion, braking, and steering. In a non-autonomous mode, none of these are controlled by a computer. Thus, one or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device (or computer) 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer, e.g., a cloud server, via a network, which, as described below, includes hardware, firmware, and software that permits computing device 115 to communicate with a remote server computer via a network such as wireless Internet (WI-FI®) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer or user mobile device.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

The one or more controllers 112, 113, 114 for the vehicle 110 may include conventional electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
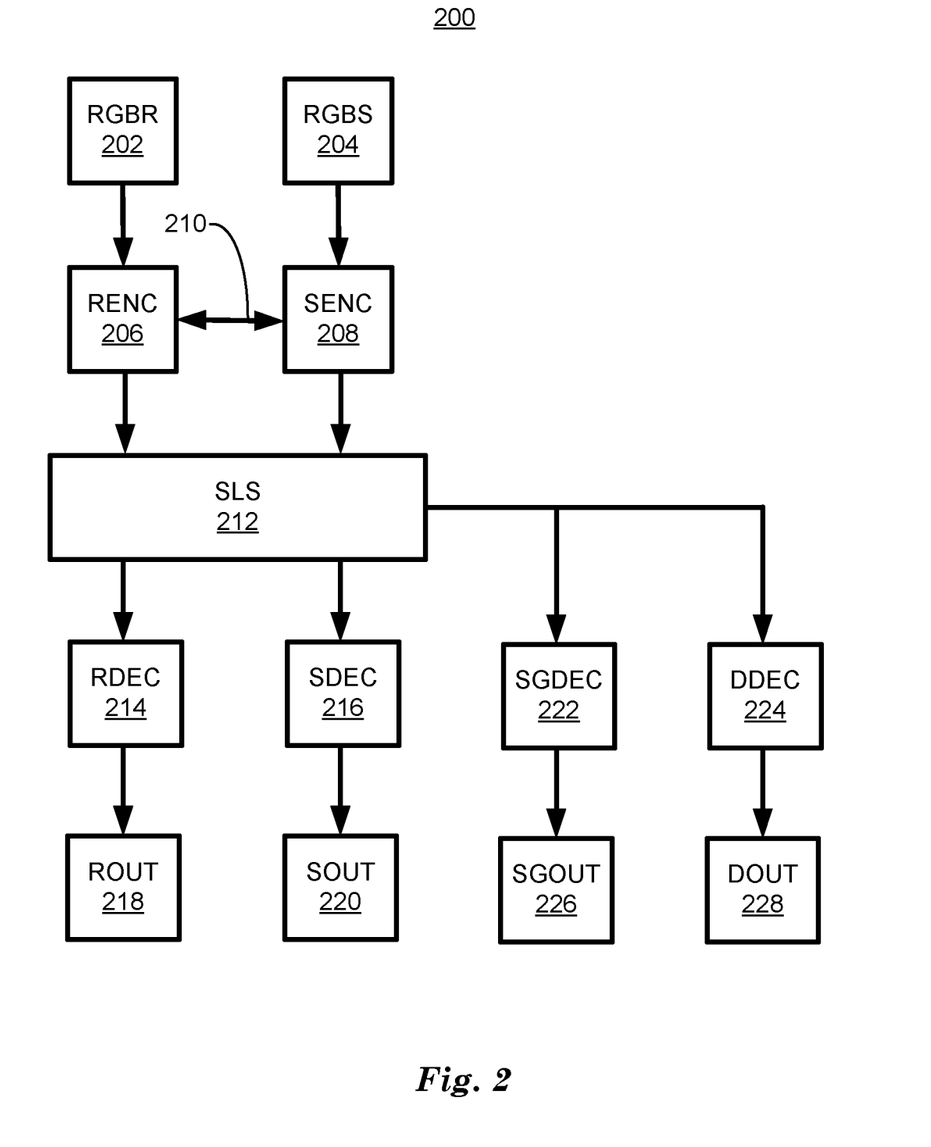
FIG. 2 is a diagram of an example twin variational autoencoder neural network.

FIG. 2 is a diagram of a twin variational autoencoder (VAE) 200. A twin VAE 200 includes two encoders (RGBR, RGBS) 206, 208 and two decoders (RDEC, SDEC) 214, 216 joined by a shared latent space 214. A VAE is a type of neural network that can learn to encode input data, typically to reduce the dimensions or size of the input data. VAEs operate by encoding the input data using encoding layers (encoders 206, 208) into a latent space (shared latent space 214). A latent space includes data corresponding to encoded input data. The encoded input data typically retains essential characteristics of the input data while discarding noise or non-essential elements of the data. VAEs also include decoding layers (decoders 214, 316) that reconstruct the encoded data in the latent space into reconstructed real images 218 and reconstructed simulated images 220 that corresponds to the input real images 202 and input simulated images 204, respectively. A VAE can be trained to encode and decode data by comparing the output data to the input data. VAEs are typically trained in an unsupervised fashion, where the VAE attempts to encode and decode the input data a plurality of times while varying the encoding and decoding parameters. The VAE can determine a loss function by comparing the output to the input, retaining the parameters that result in output data that matches the input data. Loss functions will be discussed below.

In this example, the real encoder 206 and simulated encoder 208 input real images 202 and simulated images 204, respectively and map the input real and simulated images 202, 204 into latent variables included in a shared latent space 214. A real image 202 is an image acquired by a real world sensor such as a video camera viewing a real world scene. A simulated image 204 is an image generated by photorealistic image rendering software such as Unreal Engine, produced by Epic Games, Cary, N.C. 27518. Photorealistic image rendering software is a software program that generates images that appear to an observer as it they were acquired with a real world camera viewing a real world scene. Photorealistic image rendering software generates an image based on a scene description file, which can be a text file that can include mathematical descriptions of the 3D shapes to be included in the rendered image. For example, the scene description can describe the 3D shapes in terms of intersections of rectangular solids, cylinders, etc. The scene description also includes the color and texture of surfaces in the scene. Rendering the scene includes projecting simulated light sources onto the 3D shapes and determining how the shapes would reflect the light onto a simulated camera sensor. Photorealistic image rendering software can produce images with sufficient detail that they can almost appear as if they were acquired with a real world camera to a human observer. For example, photorealistic rendering software can be used to create realistic-appearing images for video game software.

By forcing the real encoder 206 and the simulated encoder 208 to use a shared latent space 214, the twin VAE 200 can use a single set of latent variables to describe both the encoded real images 202 and simulated images 204. A latent space is the set of variables output by an encoder 206, 208 in response to input data, such as a real or simulated image 202, 204. A shared latent space 214 includes latent variables which correspond to an encoded version of the input real or simulated image 202, 204 data, where the number of latent variables is chosen to be smaller than the number of pixels that are used to represent the real or simulated image 202, 204 data. For example, an input real or simulated image 202, 204 can include over three million pixels, while shared latent space 212 can represent an input real or simulated image 202, 204 with one thousand or fewer latent variables. Proof that the shared latent space 212 correctly corresponds to the input real of simulated images 202, 204 is demonstrated by correctly reconstructing the input real or simulated image 202, 204 with real and simulated decoders 214, 216, respectively, which process the latent variables and output reconstructed real and simulated images 218, 220. Correctly reconstructing the input images 202 is verified by comparing the input real and simulated images 202, 204 with the corresponding reconstructed real and simulated images 218, 220, respectively.

Twin VAE 200 is trained in two independent stages. In the first stage, referred to as sim2real training, the twin VAE 200 is trained to input simulated images 204 and output reconstructed real images 218. In the second stage, referred to as sim2depth and sim2seg, the twin VAE 200 is trained to input simulated images 204 and output depth maps and segmentation maps. In sim2real training the simulation encoder 208 and decoder 216 pair output reconstructed simulated images 220 while real encoder 206 and decoder 214 pair output reconstructed real images 218. Real images 202 are compared to reconstructed real images 218 and simulated images 204 are compared to reconstructed simulated images 220 by calculating a loss function based on a mean-square-error (MSE) calculation. An MSE calculation determines the mean or average squared difference per pixel between a real image 202 and a reconstructed RGB image 218 and between a simulated image 204 and a reconstructed RGB image 220. During training, programming parameters that govern the operation of the encoders 206, 208 and decoders 214, 216 are selected to minimize the MSE loss function.

Because latent variables are included in a shared latent space 212, an image of one type, for example a real image 202, can be encoded by real encoder 206 into latent variables in a shared latent space 212 and then decoded by simulated image decoder 216 into a reconstructed simulated image 220. Likewise, a simulated image 204 can be encoded into latent variables in shared latent space 212 and decoded by real decoder 214 into a reconstructed real image 218. This is aided by sharing the final three layers of each real and simulated encoder 206, 208, illustrated by the bi-directional arrow 210. Sharing the final three layers means that parameters that govern the encoding are forced at training time to be the same for each of the three final layers, respectively, of encoders 206, 208. The real decoders 214 and simulated decoder 216 decode the shared latent variables in the shared latent space 212 into reconstructed real images 218 and reconstructed simulated images 220. The twin VAE 200 is trained to encode and decode real and simulated images 202, 204 into reconstructed real and simulated images 218, 220 by varying the parameters that control encoding and decoding the images and comparing the reconstructed real and simulated images 218, 220 to the input real and simulated images 202, 204, respectively. By restricting the number of latent variables used to represent the encoded images in the shared latent space 212, a compact encoding that encodes both real and simulated images 202, 204 can be achieved.

Once the twin VAE 200 has been trained on both real and simulated images 202, 204, the decoders 214, 216 can be disconnected from the shared latent space 214 and a segmentation decoder (SGDEC) 222 and a depth decoder (DDEC) 224 can be connected to shared latent space 214 and trained using labeled simulated data 204 that includes ground truth based on the scene description data that was used to render the simulated data 204. Segmentation decoder 222 is discussed in relation to FIG. 5 and depth decoder is discussed in relation to FIG. 6.

The encoder 206, 208 layers and decoder 214, 216 layers are configured as packing and unpacking layers to improve generation of latent variables to include in shared latent space 212. Typically, real and simulated image encoders 206, 208 and real and simulated decoders 214, 216 are configured to increase and decrease convolutional stride and pool and un-pool data, respectively. Convolutional stride is an encoding technique for reducing resolution and thereby performing data reduction on input data by skipping over pixels in both x and y dimensions. For example, convolutions can be performed on every second column or row of pixels in an image. Convolutional stride is coupled with pooling, where a neighborhood of pixels is treated as a single pixel for output to the next level. A typical operation is max pooling, where the maximum value included in a neighborhood of pixels is used to represent the entire neighborhood for output, thereby reducing a 2×2 neighborhood of pixels to a single pixel, for example. The process can be reversed for decoding, where the output of a convolutional layer can be replicated to increase resolution, for example. Following pixel replication, the output can be filtered with a smoothing filter, for example, to reverse the max pooling operation and at least partially restore the original data.

Packing and unpacking can improve generation of latent variables and restoration of input data from the latent variables by replacing convolutional stride and pooling by performing 3D convolutions which reduce spatial resolution while increasing depth resolution, thereby preserving input data. Packing layers first perform a space to depth transformation that encodes spatial data into bit depth data. Packing then performs 3D convolutions that reduce spatial resolution while maintaining bit depth data. Packing then performs reshaping operations that further encodes the bit depth data followed by 2D convolutions to filter the output latent variables. Decoding layers reverse this sequence to restore the latent variables to full resolution. Packing and unpacking is described in "3D Packing for Self-Supervised Monocular Depth Estimation" Vitor Guizilini, Rares Ambrus, Sudeep Pillai, Allan Raventos, and Adrien Gaidon, Toyota Research Institute, arXiv.org, 1905.02693v4, 28 Mar. 2020.

Figure 3:
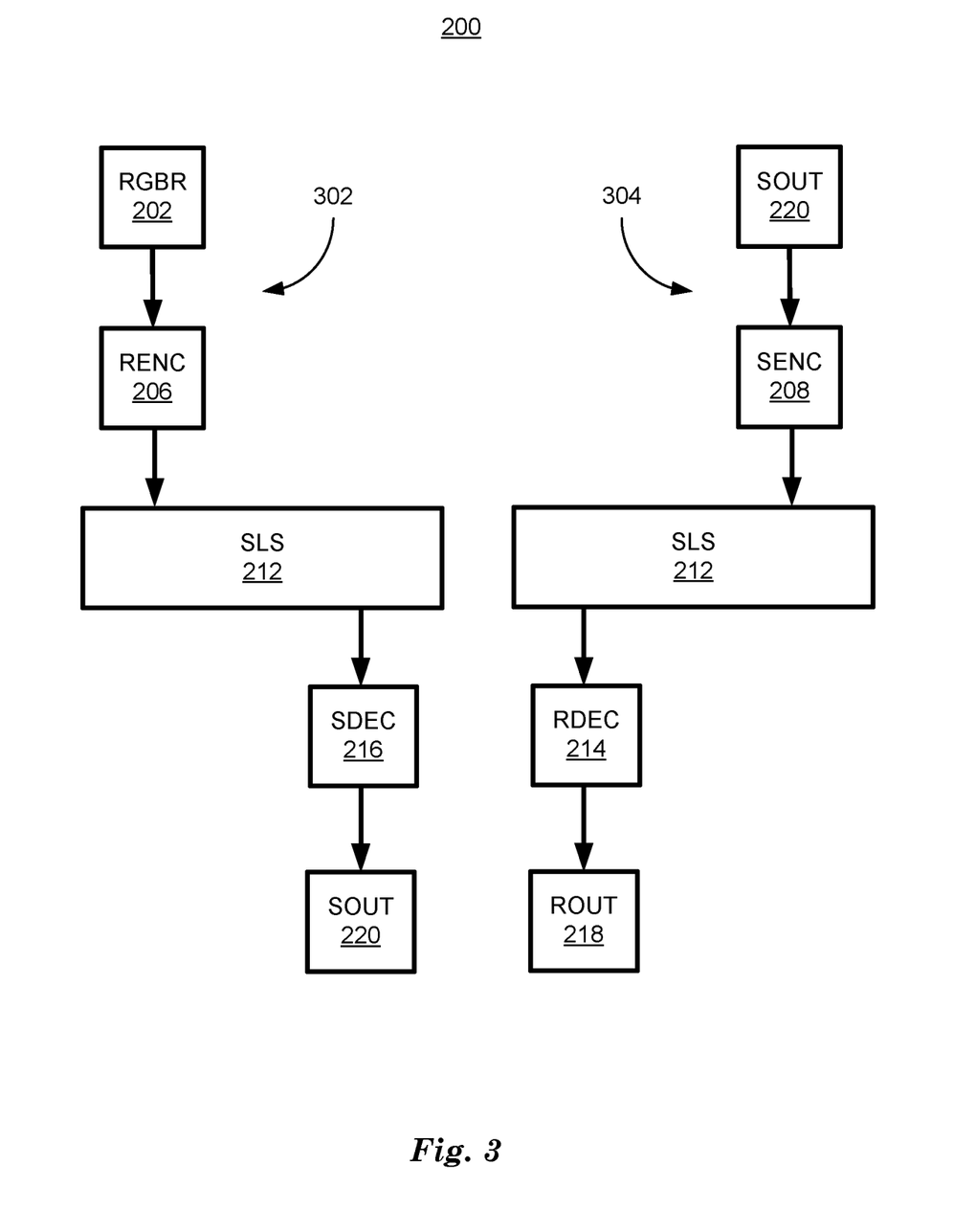
FIG. 3 is a diagram of an example twin variational autoencoder neural network configured for training based on cycle consistency.

FIG. 3 is a diagram of a twin VAE 300 configured to determine cycle consistency. The twin VAE 300 includes a first configuration 302 and a second configuration 304. First configuration 302 inputs a real image 202 and outputs a reconstructed simulated image 220. The twin VAE 300 is then configured into a second configuration 304 where the simulated output RGB image 220 output from the first configuration 302 is input to the simulated encoder 208 to be decoded by real decoder 214 into a reconstructed real image 218. Cycle consistency is a technique for training a twin VAE 300 to produce reconstructed real image 218 from a simulated image 320 based on unpaired data. Paired data is image data where a simulated image 204 is generated to match each real image 202, i.e. where the simulated scene matches the objects, their appearance, and their arrangement in a real image. Producing paired training data requires users to analyze real image 202 data, estimate a scene description required to produce a simulated copy of each real image 202 by determining a scene description file that includes all of the objects in the real image 202, at the same locations as the objects in the real image 202. Real world locations of objects occurring in real image 202 can be determined by photogrammetry. Photogrammetry is a technique for determining real world sizes and locations of objects using data regarding real world camera locations and orientation. For example, a roadway can be assumed to define a plane upon which objects such as vehicles are positioned. Data regarding camera position and orientation with respect to a roadway and camera lens magnification can be used to convert pixel locations in an image to real world locations.

The scene description file must contain instructions to render simulated image 204 in such a fashion as to produce a realistic copy of the real image 202, including the appearance and location of each object occurring in the real image 202. Photorealistic rendering software inputs a scene description file including real world locations of objects and renders a 2D image by simulating a camera and lens and tracing light rays reflected or emitted from the objects through the simulated lens onto a simulated image plane in a simulated camera. Producing paired image data is expensive, time consuming and requires extensive human work to determine the scene description files that include real world 3D locations of each object in the real world image. It is theoretically possible to automate this task, however producing and executing the software required to analyze the real images 202 and produce the paired simulated images would require extensive human programming effort and extensive computer resources. Unpaired data is image data where real images 202 and simulated images 204 do not match, i.e. where the scene description files used to generate the simulated images 204 are not generated from real images 202. Producing a training dataset including unpaired simulated images 204 requires a fraction of the human effort and computer resources required to produce paired image data. Training a twin VAE 300 using cycle consistency as described herein permits training the twin VAE 300 using unpaired data, which reduces the time, expense, human labor and computing resources required to produce a training dataset.

Twin VAE 200 is first trained as discussed in relation to FIG. 2 to train the real encoder 206 and real decoder 214 to input real images 202 and output reconstructed real images 218. The twin VAE 200 is also trained as discussed in relation to FIG. 2 to train the simulated encoder 208 and simulated decoder 216 to input simulated images 204 and output reconstructed simulated images 220. Following this training, the twin VAE 200 is configured to form twin VAE 300, first and second configurations 302, 304. The twin VAE 300 first configuration 302 encodes the real images 202 using the real encoder 206 to form latent variables in the shared latent space 212. Because the shared latent space 212 is shared between real and simulated datasets, the latent variables in the shared latent space 212 can be output to simulated decoder 216 to produce reconstructed simulated images 220 based on real image 202 input. The reconstructed simulated images 220 are then input to the twin VAE 300 second configuration 304 and encoded using simulated encoder 208 to produce latent variables in shared latent space 212. Because the latent variables are included in shared latent space 212, the latent variables can be output to real decoder 214 to be decoded into reconstructed real images 218.

Cycle consistency works by comparing the input real images 202 to the reconstructed real images 218 to determine consistency between real encoding and decoding and simulated encoding and decoding. To provide more accurate comparisons between the input and output and compensate for the differences in image encoding and decoding between real and simulated images, Kullback-Liebler (KL) divergence and maximum mean discrepancy loss (MMD) are calculated instead of MSE. Because encoding and decoding the images using real and simulated decoders and encoders can introduce visual artifacts into the images being compared, a simple MSE loss function cannot be successfully used to minimize the loss function. For example, the overall intensity or brightness of the image might be changed by encoding and decoding an input image twice as required to determine cycle consistency. While the overall brightness does not impact segmentation or depth processing by a neural network, it will affect MSE calculations. KL divergence and MMD loss are measures based on probability distributions of pixel values rather than absolute measures like MSE and are therefore less subject to artifacts introduced by repeated encoding and decoding.

KL divergence measures the difference between multivariate probability distributions and does not depend upon the distributions having the same mean. For example, probability distributions of pixel values can be compared between input real images 202 and output reconstructed real images 218 following repeated encoding and decoding. Training the twin VAE 300 can be based on minimizing a loss function based on the differences between the distributions rather than per-pixel differences. KL divergence $D_{KL}$ is based on the expectation of the logarithmic difference between two probability distributions and P and Q described by the equation:

$$D_{KL}(P\|Q) = \sum_{x \in X} P(x) \log\left(\frac{P(x)}{Q(x)}\right) \quad (1)$$

Twin VAE 300 first and second configurations 302, 304 can also be trained to maximize cycle consistency by minimizing a loss function based on MMD loss. MMD loss is calculated by determining the square of the mean distance $M_k$ between two distributions $\mathbb{P}$, $\mathbb{Q}$ according to the equation:

$$M_k(\mathbb{P}, \mathbb{Q}) = \|\mu_\mathbb{P} - \mu_\mathbb{Q}\|_H^2 = \mathbb{E}_\mathbb{P}[k(x,x')] - \mathbb{E}_{\mathbb{P},\mathbb{Q}}[k(x,y)] + \mathbb{E}_\mathbb{Q}[k(y,y')] \quad (2)$$

Where $\mu_\mathbb{P}$ and $\mu_\mathbb{Q}$ are the means of the distributions, $\mathbb{E}_\mathbb{P}$, $\mathbb{E}_\mathbb{Q}$, and $\mathbb{E}_{\mathbb{P},\mathbb{Q}}$ are the expectations for the distributions $\mathbb{P}$, $\mathbb{Q}$ and the joint expectation, respectively, and k is a kernel function, in this example a Gaussian kernel. The square mean distance $M_k$ is zero if and only if $\mathbb{P} = \mathbb{Q}$. Calculating the MMD based on equation (2) can yield a loss function that measures the distance between distributions of pixel values assuming that the pixel values follow a Gaussian distribution. Calculating a loss function based on the MMD can determine whether images are similar despite being based on different objects in different configurations, and can therefore be used to compare input real and simulated images 202, 204 to reconstructed real and simulated images 218, 220 following repeated encoding and decoding as performed by twin VAE 300 first and second configurations 302, 304 as described below in relation to FIGS. 4 and 5.

Figure 4:
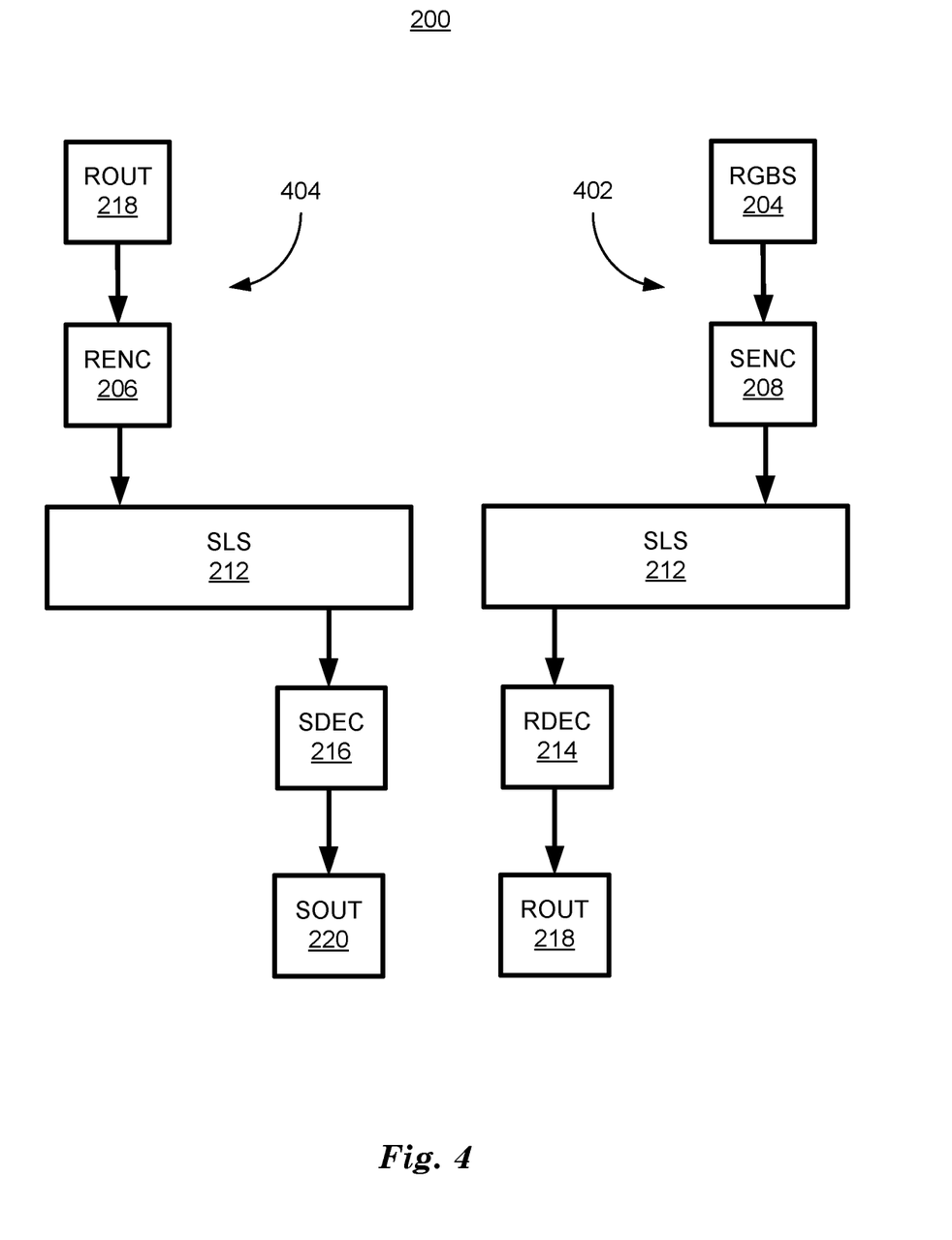
FIG. 4 is a diagram of another example twin variational autoencoder neural network configured for training based on cycle consistency.

FIG. 4 is a diagram of a twin VAE 200 in first and second configurations 402, 404 that mirror first and second configurations 302, 304 from FIG. 3. In similar fashion as described above in relation to FIG. 4, twin VAE 200, first and second configurations 402, 404 can be trained to input real images 204 and output reconstructed simulated images 220 using cycle consistency. In twin VAE 200, the first configuration 402 inputs a simulated image 204, encodes is using the simulated encoder 208 and produces latent variables included in the shared latent space 212. The latent variables are then output to the real image decoder 214 to be encoded into reconstructed real images 218. The reconstructed real images 218 are input to twin VAE 200 second configuration 404 to be encoded using real encoder 206 to form latent variables included in the shared latent space 212. The latent variables are then output to simulated decoder 216 to be output as reconstructed simulated images 220. The reconstructed simulated images 220 are compared to the input simulated images 204 using KL divergence and MMD loss to train the twin VAE as described above in relation to FIG. 3. Training the twin VAE 200 as described in relation to FIGS. 3 and 4 permits the twin VAE 200 to input either real images 202 or simulated images 204 and produce either reconstructed real images 218 or reconstructed simulated images 220.

Figure 5:
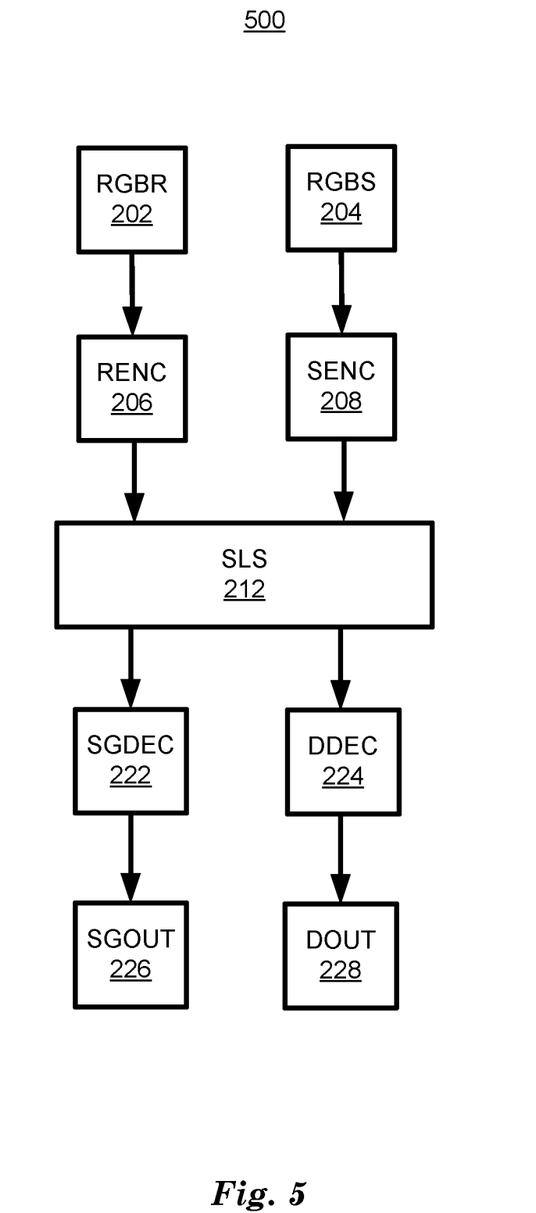
FIG. 5 is a diagram of an example variational autoencoder neural network configured to produce segmentation maps and depth maps.

Once this training has been accomplished, the twin VAE 200 can be configured as described in relation to FIG. 5 to train the twin VAE 200 using simulated images 204 that include ground truth data to produce segmentation maps and depth maps. Because the twin VAE 200 has also been trained to using both real and simulated images 202, 204 as described in relation to FIGS. 3 and 4, the twin VAE 200 can input real images 202 and produce segmentation maps and depth maps despite not having been trained using real images 202. In this fashion, a twin VAE 200 can be trained without having to produce expensive and time consuming ground truth data for real images 202 or produce expensive and time consuming paired real and simulated images 202, 204.

Training a twin VAE 200 can also be used to reduce problems caused by training a neural network based on simulated images. Training a neural network using simulated images can cause difficulties when real images are presented to the neural network in operation. Because of slight differences between the appearance of real image and simulated images, a neural network trained on simulated images can have difficulty processing real images to determine segmentation maps and depth maps correctly. Training a twin VAE 200 using cycle consistency methods as discussed herein can improve the performance of a neural network in processing real images based on training with simulated images.

FIG. 5 is a diagram of a twin VAE 500 configured to train and a twin VAE 500 to produce segmentation maps and depth maps. Because the real encoder 206 and simulated encoder 208 have been trained as discussed above in relation to FIGS. 2, 3, and 4, the latent variables included in shared latent space 212 will be consistent regardless of whether a real image 202 or a simulated image 204 is input to the twin VAE 500. This permits the twin VAE 500 to be trained using simulated images 204 that include ground truth data for both segmentation and depth. Because the scene description data used to generate the simulated images 204 includes detailed 3D descriptions of all of the surfaces included in the simulated image, accurate and highly detailed segmentation and depth ground truth data can be obtained without the laborious, time-consuming, expensive, and computer resource intensive process of generating ground truth data. The twin VAE 500 can be trained to encode simulated images 204 with simulated encoder 208 into latent variables in shared latent space 212, and then decode the latent variables with segmentation decoder 222 and depth decoder 224 to produce a segmentation map (SGOUT) 226 and depth map (DOUT) 228, respectively. To train the segmentation decoder 222 and the depth decoder 224, the output segmentation map 226 and output depth map 228 can be compared to the segmentation ground truth data and depth ground truth data corresponding to the input simulated image 204 using an MSE loss function as discussed above with respect to FIG. 2 to select the decoding parameters corresponding to the most accurate results.

Because the twin VAE 500 has been trained to generate latent variables that are consistent between real images 202 and simulated images 204, real images 202 can be input to a real image encoder 206 to form latent variables in shared latent space 212. The latent variables can then be output to segmentation decoder 222 to form a segmentation map 226 and depth decoder 224 to form a depth map 228. Because segmentation decoder 222 and depth decoder 224 were trained using synthetic images 204 that formed latent variables in a shared latent space 214, latent variables in the shared latent space 214 formed based on input real images 202 can be processed by segmentation decoder 222 and depth decoder 224 just as if they were synthetic images 204, thereby processing latent variables formed from real images 202 without requiring ground truth data corresponding to the real images 202 to train the VAE 200. Techniques discussed herein improve training of a twin VAE 500 to determine segmentation maps and depth maps based on inputting real images by using a shared latent space 212 that permits training the twin VAE 500 with a small number (typically <100) of unlabeled real images 202 and a large number (typically >1000) of labeled simulated images 204, thereby reducing the expense, time and manual effort required to train the twin VAE 500 to generate segmentation maps 226 and depth maps 228. As discussed above simulated images 204 are generated based on scene descriptions that include the real world location and size of objects that occur in the simulated image 204.

Because the real world location and size of objects in the simulated image 204 are available in the scene description file, image corresponding to segmentation maps and depth maps can be generated from the scene description data in the same fashion in which the simulated image is rendered. For a segmentation map, rather than render the reflections of ambient light onto an image sensor, segmentation rendering software can generate an image that identifies regions corresponding to objects in an image thereby forming a segmentation map. For a depth map, depth rendering software can generate an image where the pixels of the image correspond to the distance from a sensor to points in the scene thereby forming a depth map. Segmentation maps and depth maps corresponding a simulated image 202 in this fashion can be used to train segmentation decoder 222 and depth decoder 224 to produce segment maps 226 and depth maps 28 based on simulated image 204 input. Following training, twin VAE 500 can input a real image 202 and produce a segmentation map 226 and a depth map 228 without retraining because the twin VAE 500 was trained to produce reconstructed real images 218 and reconstructed simulated images 220 in a cycle consistent fashion as discussed in relation to FIGS. 3 and 4, above.

Figure 6:
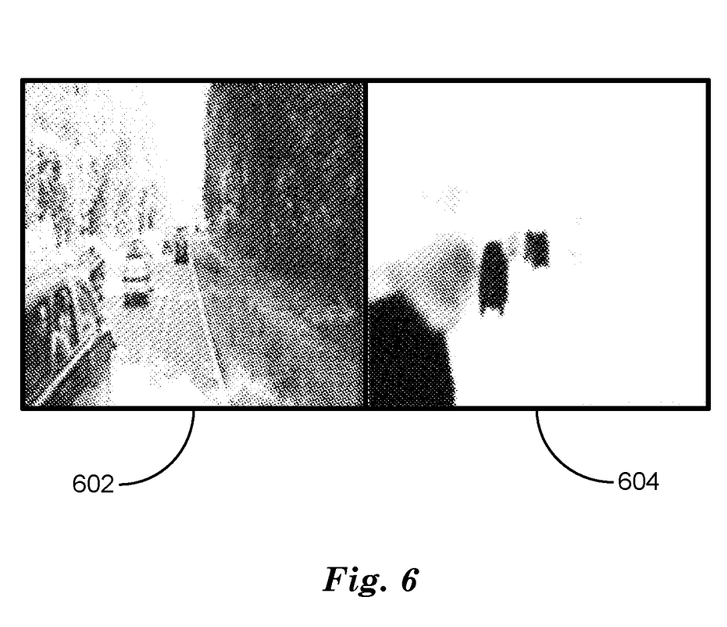
FIG. 6 is a diagram of an example real image and corresponding segmentation map.

FIG. 6 is a diagram of a real image 602 and a corresponding segmentation map 604. Segmentation map 604 is generated by inputting real image 202 into a trained twin VAE 500 that includes a trained segmentation decoder 222. In segmentation map 604, the outlines of objects, including vehicles, have been processed and replaced with regions of a single grayscale or color value that corresponds to a "vehicle" label. A segmentation map 604 can also be an "instance" segmentation map where each vehicle is determined to be a separate instance of a vehicle and is assigned a unique color or grayscale value to identify each vehicle separately.

Figure 7:
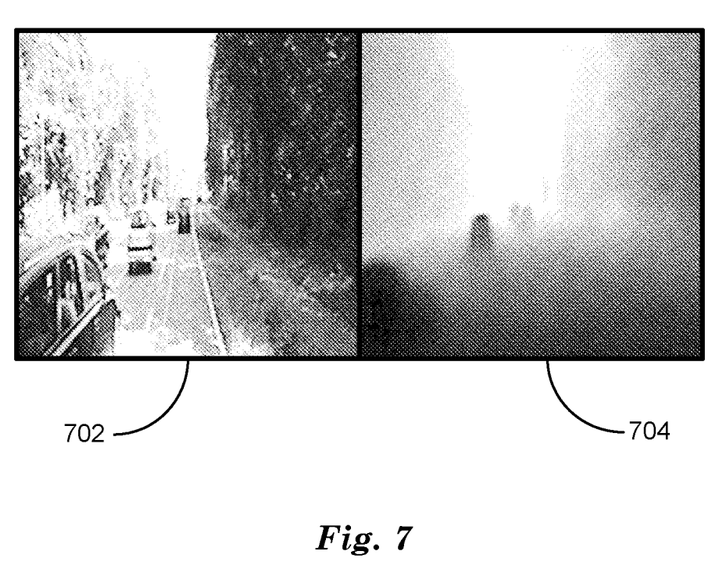
FIG. 7 is a diagram of an example real image and corresponding depth map.

FIG. 7 is a diagram of a real image 702 and a depth map 704. Depth map 704 is generated by inputting real image 202 into a trained twin VAE 500 that includes a trained depth decoder 224. In depth map 704 each pixel in the input real image 702 is replaced by a grayscale value that corresponds to a distance between the sensor that acquired the real image 702 and the object in the scene.

Figure 8:
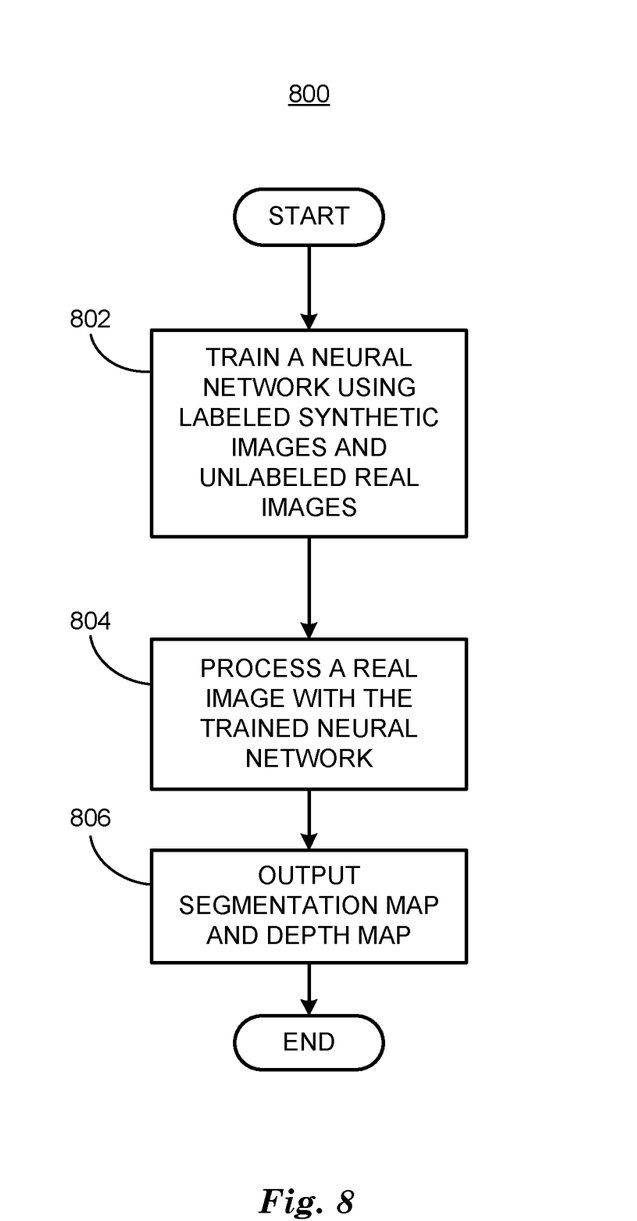
FIG. 8 is a flowchart diagram of an example process to train and operate a neural network to produce a segmentation map and a depth map.

FIG. 8 is a diagram of a flowchart, described in relation to FIGS. 1-7, of a process for generating a segmentation map 226 and a depth map 228 based on a real image 202. Process 800 can be implemented by a processor of computing device, taking as input information from sensors, and executing commands, and outputting object information, for example. Process 800 includes multiple blocks that can be executed in the illustrated order. Process 800 could alternatively or additionally include fewer blocks or can include the blocks executed in different orders.

Process 800 begins at block 802, where a computing device trains located in a server computer trains a twin VAE 200 neural network to generate reconstructed real images 218 and reconstructed simulated images 220 based on real image 202 and simulated image 204 input using cycle consistency methods as discussed in relation to FIGS. 2, 3 and 4, above. A twin VAE 500 can then be trained to generate segmentation maps 226 and depth maps 228 in response to input real images 202 based on training the twin VAE 500 using simulated images 204 and corresponding ground truth as discussed in relation to FIG. 5.

At block 804 the trained twin VAE 500 can be downloaded to a computing device 115 in a vehicle 110. The twin-VAE can be used to input real images 202 and output segmentation maps 226 and depth maps 228 as discussed in relation to FIGS. 6 and 7 in response to real image 202 input. The real images 202 can be generated by vehicle sensors such as color video cameras, for example.

At block 806 the twin VAE 500 can output a segmentation map 226 and a depth map 228 to software executing in computing device 115 to be used to operate a vehicle 110. The segmentation map 226 and depth map 228 can be used to determine a vehicle path. A technique for determining a vehicle path includes using the segmentation map and depth map to produce a cognitive map of the environment around a vehicle. A cognitive map is a top-down view of the environment around a vehicle that includes roadways and objects such as vehicles and pedestrians, for example. A vehicle path can be determined by selecting a local route on the cognitive map that is consistent with a vehicle route plan. A vehicle route plan can include a route from a starting point to a final destination such as "work" or "home" and can be determined by using locations and maps stored in computing device 115 memory or downloaded from a server computer via the Internet, for example. A vehicle path is a polynomial function that describes a local route to be traveled by a vehicle from the current location of the vehicle 110 to a local destination on the vehicle route plan. The polynomial function can be determined to maintain vehicle lateral and longitudinal accelerations within predetermined limits. The computing device 115 can control vehicle steering, brakes and powertrain via controllers 112, 113, 114 to cause the vehicle 110 to move along the polynomial function and thereby travel on the planned vehicle path. Following block 806 process 800 ends.

Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer, comprising:
a processor; and
a memory, the memory including instructions executable by the processor to:
receive a monocular image and provide the image to a variational autoencoder neural network (VAE), wherein the VAE has been trained in a twin configuration that includes a first encoder-decoder pair that receives as input unlabeled real images and outputs reconstructed real images, and a second encoder-decoder pair that receives as input synthetic images and outputs reconstructed synthetic images and wherein the VAE includes third and fourth decoders that are trained using labeled synthetic images, segmentation ground truth and depth ground truth; and
output from the VAE a segmentation map and a depth map based on inputting the monocular image.

2. The computer of claim 1, wherein training the VAE in a twin configuration includes a third decoder outputting the segmentation map and a fourth decoder outputting the depth map.

3. The computer of claim 1, wherein the segmentation ground truth includes labels for a plurality of objects in the labeled synthetic images, and the depth ground truth includes distances from a sensor to a plurality of locations in the labeled synthetic images.

4. The computer of claim 1, wherein the segmentation map includes labeled objects including roadways, buildings, foliage, vehicles and pedestrians.

5. The computer of claim 1, wherein the depth map includes distances from a sensor to a plurality of locations.

6. The computer of claim 1, wherein the real image is acquired by a real world sensor viewing a real world scene.

7. The computer of claim 1, wherein the synthetic images are generated by photorealistic image rendering software based on data input to the photorealistic image rendering software that describes a scene to be rendered by the photorealistic image rendering software.

8. The computer of claim 7, wherein the segmentation ground truth and depth ground truth are generated based on a scene description input to the photorealistic image rendering software that describes the scene to be rendered by the photorealistic image rendering software.

9. The computer of claim 1, wherein the VAE includes first and second encoders for the unlabeled real images and the labeled synthetic images, and further wherein the first and second encoders each include layers that share weights with the other of the first or second encoder, a shared latent space, and respective first and second decoders for the unlabeled real images and labeled synthetic images.

10. The computer of claim 1, wherein the VAE is further trained based on determining cycle consistency between the first encoder-decoder and the second encoder-decoder.

11. The computer of claim 10, wherein training the VAE based on determining cycle consistency includes comparing an input real image and a reconstructed real image by determining Kullback-Leibler divergence loss and maximum mean discrepancy loss.

12. The computer of claim 1, the instructions including further instructions to operate a device based on the segmentation map and the depth map.

13. The computer of claim 12, wherein the device is one of a vehicle, a mobile robot, a stationary robot, a drone, and a surveillance system.

14. The computer of claim 13, the instructions including further instructions to operate the vehicle by controlling one or more of vehicle propulsion, vehicle brakes, and vehicle steering based on determining a vehicle path based on the segmentation map and the depth map.

15. A method, comprising:
receiving a monocular image and provide the image to a variational autoencoder neural network (VAE), wherein the VAE has been trained in a twin configuration that includes a first encoder-decoder pair that receives as input unlabeled real images and outputs reconstructed real images, and a second encoder-decoder pair that receives as input synthetic images and outputs reconstructed synthetic images and wherein the VAE includes third and fourth decoders that are trained using labeled synthetic images, segmentation ground truth and depth ground truth; and outputting from the VAE a segmentation map and a depth map based on inputting the monocular image.

16. The method of claim 15, wherein training the VAE in a twin configuration includes a third decoder outputting the segmentation map and a fourth decoder outputting the depth map.

17. The method of claim 15, wherein the segmentation ground truth includes labels for a plurality of objects in the labeled synthetic images, and the depth ground truth includes distances from a sensor to a plurality of locations in the labeled synthetic images.

18. The method of claim 15, wherein the segmentation map includes labeled objects including roadways, buildings, foliage, vehicles and pedestrians.

19. The method of claim 15, wherein the depth map includes distances from a sensor to a plurality of locations.

20. The method of claim 15, wherein the real image is acquired by a real world sensor viewing a real world scene.

* * * * *